(12) United States Patent
Urushihara et al.

(10) Patent No.: US 9,923,178 B2
(45) Date of Patent: Mar. 20, 2018

(54) SEALING MEMBER OF TUBE-SHAPED BATTERY AND TUBE-SHAPED BATTERY

(71) Applicants: FDK TOTTORI CO., LTD., Tottori (JP); FDK CORPORATION, Tokyo (JP)

(72) Inventors: Kanji Urushihara, Tottori (JP); Shohei Itagaki, Tokyo (JP)

(73) Assignee: FDK Corporation, Tokyo (JP)

( * ) Notice: Subject to any disclaimer, the term of this patent is extended or adjusted under 35 U.S.C. 154(b) by 37 days.

(21) Appl. No.: 15/079,511

(22) Filed: Mar. 24, 2016

(65) Prior Publication Data
US 2016/0285057 A1    Sep. 29, 2016

(30) Foreign Application Priority Data

Mar. 25, 2015 (JP) ................................. 2015-062950

(51) Int. Cl.
| | | |
|---|---|---|
| H01M 2/04 | (2006.01) | |
| H01M 2/02 | (2006.01) | |
| H01M 2/06 | (2006.01) | |
| H01M 6/14 | (2006.01) | |
| F16J 15/06 | (2006.01) | |
| H01M 2/08 | (2006.01) | |
| H01M 6/16 | (2006.01) | |

(52) U.S. Cl.
CPC ......... *H01M 2/046* (2013.01); *H01M 2/0482* (2013.01); *H01M 2/06* (2013.01); *H01M 6/14* (2013.01); *H01M 2/08* (2013.01); *H01M 6/16* (2013.01)

(58) Field of Classification Search
CPC ...... H01M 2/046; H01M 2/0482; H01M 2/06; H01M 2/08; H01M 6/14; H01M 6/16
See application file for complete search history.

(56) References Cited

U.S. PATENT DOCUMENTS

2011/0097612 A1*  4/2011  Lee ................... H01M 2/0404
                                                                429/53

FOREIGN PATENT DOCUMENTS

| JP | 2008-251213 | 10/2008 |
|---|---|---|
| JP | 2008-270167 | 11/2008 |

* cited by examiner

*Primary Examiner* — Brittany Raymond
(74) *Attorney, Agent, or Firm* — Greer Burns & Crain Ltd.

(57) ABSTRACT

A sealing member 40 to seal an opening of a battery can, the sealing member being used to configure a tube-shaped battery provided with a bottomed tube-shaped battery can and a power generating element that has been arranged inside the battery can, the sealing member 40 includes an electrode terminal that is to be electrically connected to the power generating element, a sealing plate 41, insulating gaskets 42a, 42b, and a washer 44. An inserting part 43b extending from the electrode terminal 43 is inserted through these elements so that the elements are integrally tightened. The insulating gasket 42a is provided with a protruding part 42a1 having an appropriate horizontal section shape, and the sealing plate 41 adjacent to the insulating gasket is provided with a recess part 41a that has been formed in a shape corresponding to the protruding part 42a1.

3 Claims, 4 Drawing Sheets

SEALING MEMBER OF TUBE-SHAPED BATTERY AND TUBE-SHAPED BATTERY

CROSS-REFERENCE TO RELATED APPLICATIONS

The present application claims priority upon Japanese Patent Application No. 2015-062950 filed on Mar. 25, 2015, which is herein incorporated by reference.

BACKGROUND

Technical Field

The present invention relates to a sealing member of a tube-shaped battery and the tube-shaped battery with the sealing member.

Related Art

A tube-shaped battery has been widely used as a battery as a power supply of various electrical appliances. The tube-shaped battery has a basic configuration formed by sealing an opening of a bottomed tube-shaped battery can storing a power generating element with a metallic sealing plate to seal the battery can, and is attached with an electrode terminal. Such a tube-shaped battery is used for small-sized appliances, such as cellular phones, notebook computers, and digital cameras, and is also used as a power source of such as electric vehicles and hybrid vehicles. In either of the uses, the tube-shaped battery is required to have a high degree of sealability to be able to certainly prevent leakage of the battery's contents.

From the viewpoint of ensuring the above sealability, for example, in Japanese Patent Application Laid-open Publication No. 2008-251213, there is proposed a sealed battery including an electrode external terminal provided with a columnar inserting part, an insulating gasket, and a sealing plate, and these parts are tightened integrally with the columnar inserting part, and is configured provided with an annular protruding part that contacts the insulating gasket from the front and the back and does not easily leak liquid even when vibration or impact is applied. Further, in Japanese Patent Application Laid-open Publication No. 2008-270167, there is proposed a sealed battery having a similar configuration to that in the former patent reference, configured with a recess part that corresponds to a horizontal section shape of the columnar inserting part provided to the insulating gasket. Thus, it is asserted that sealability may be further increased.

In the above patent references, however, the insulating gasket is pressed with the annular protruding parts or the columnar inserting part in order to increase sealability. Thus, the insulating gasket is compressed and slightly expanded outwards when tightened and fixed with the columnar inserting part, and sufficient sealability with the force of repulsion of the insulating gasket could not be obtained.

SUMMARY

This invention has been made in view of the above, and an objective of this invention is to provide a sealing member of a tube-shaped battery that can further increase sealability and a tube-shaped battery.

In view of the above and other cases, an aspect of the invention is a sealing member of a tube-shaped battery to seal an opening of a battery can, the sealing member being used to configure a tube-shaped battery provided with the bottomed tube-shaped battery can and a power generating element that has been arranged inside the battery can, the sealing member including:
an electrode terminal that is to be electrically connected to the power generating element;
a tabular sealing plate having a flat shape that comes in close contact with an inner peripheral surface of an opening of a battery can; and
an insulating gasket that comes in close contact with the sealing plate and the electrode terminal in order to electrically insulate between the sealing plate and the electrode terminal,
wherein a side of the insulating gasket adjacent to the sealing plate is provided with a protruding part having a predetermined horizontal section shape,
a side of the sealing plate adjacent to the insulating gasket is provided with a recess part that has been formed in a shape corresponding to the protruding part, and
an inserting part that is a columnar member extending from the electrode terminal is inserted into the sealing plate and the insulating gasket and at least the sealing plate and the insulating gasket are pressed to each other, and the protruding part of the insulating gasket is held in a compressed state in the recess part of the sealing plate.

Another aspect of the invention is a tube-shaped battery including:
a bottomed tube-shaped battery can;
a power generating element that has been arranged inside the battery can; and
a sealing member to seal an opening of the battery can, the sealing member including an electrode terminal that is to be electrically connected to the power generating element,
wherein the sealing member includes
a tabular sealing plate having a flat shape that comes in close contact with an inner peripheral surface of the opening of the battery can, and
an insulating gasket that comes in close contact with the sealing plate and the electrode terminal in order to electrically insulate between the sealing plate and the electrode terminal,
a side of the insulating gasket adjacent to the sealing plate is provided with a protruding part having a predetermined horizontal section shape,
a side of the sealing plate adjacent to the insulating gasket is provided with a recess part formed in a shape corresponding to the protruding part,
an inserting part that is a columnar member extending from the electrode terminal is inserted into the sealing plate and the insulating gasket and at least the sealing plate and the insulating gasket are pressed to each other, and the protruding part of the insulating gasket is held in a compressed state in the recess part of the sealing plate.

Other features of the present invention will be made clear through the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DESCRIPTION OF EXEMPLARY EMBODIMENTS

The following matters of the embodiment of the present invention will be described specifically with reference to the accompanying drawings. This invention is not to be construed limitative to the embodiment.

Figure 1:
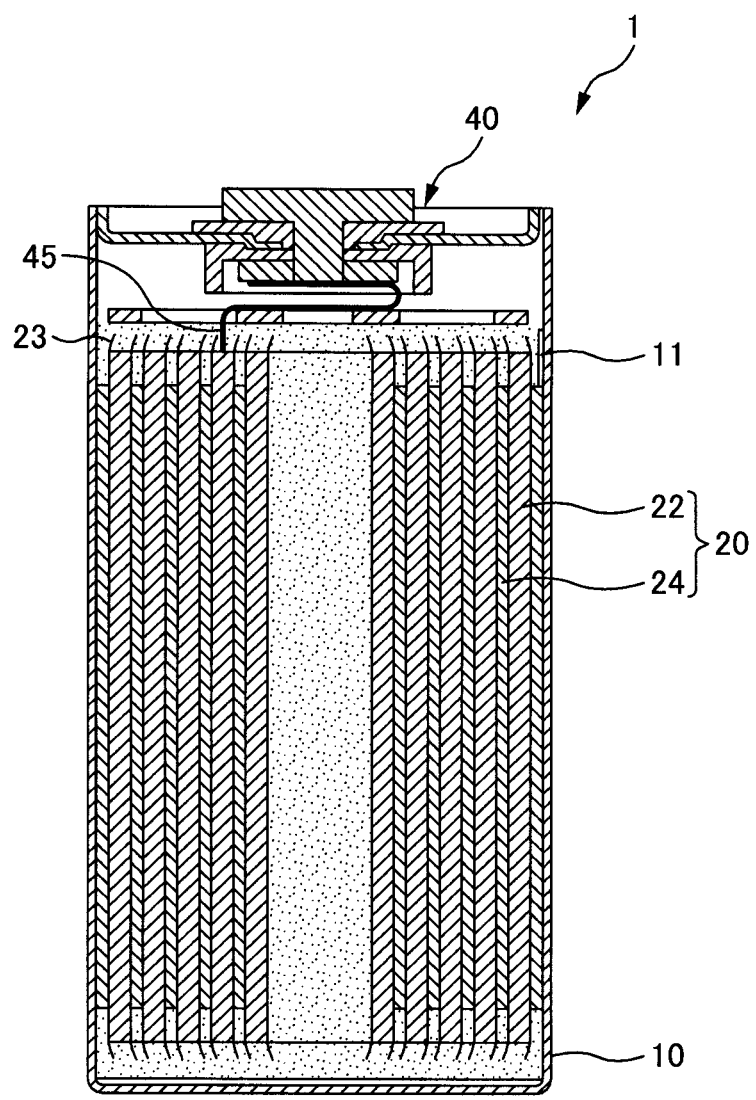
FIG. 1 is a vertical section view illustrating a structure of a tube-shaped battery 1 of an embodiment of this invention.

First, FIG. 1 shows a vertical section view showing a configuration example of a tube-shaped battery 1 of the present embodiment. The tube-shaped battery 1 in FIG. 1 is configured to store a power generating element 20 inside a bottomed tube-shaped battery can 10. The tubular shape may be a cylindrical shape or may be a different rectangular-tubular shape. There is shown as an example of a lithium primary battery configured with, as the power generating element 20, cathodes 22 made by, for example, a stainless lath plate applied with a slurry cathode material cut into a predetermined size and dried, and anodes 24 that are plate shaped lithium metal or lithium alloy formed in a spiral shape through a separator 23 made of, for example, a polyolefin microporous membrane. In FIG. 1, the cathode 22 and a lower surface of an electrode terminal 43 to be described later, and the anode 24 and an inner surface of the battery can 10 are connected via a cathode tab 45 and an anode tab 11. It should be noted that, this invention may be applied to other types of tube-shaped batteries such as alkaline batteries.

Figure 2:
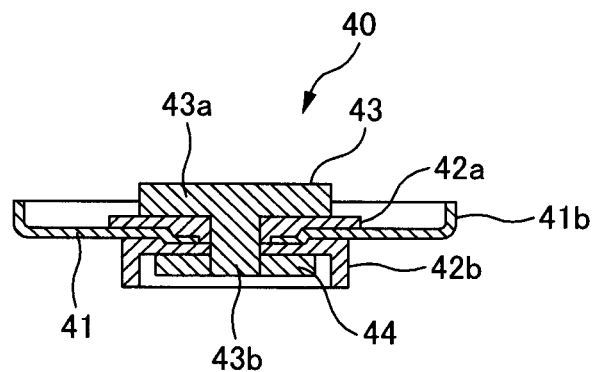
FIG. 2 is a vertical section view of a sealing member 40 provided to the tube-shaped battery 1 in FIG. 1.

As shown in FIG. 1, an opening end of the battery can 10 is sealed with a sealing member 40. FIG. 2 shows a vertical section view of the sealing member 40. The sealing member 40 includes a sealing plate 41, insulating gaskets 42a, 42b, the electrode terminal 43, and a washer 44. The sealing plate 41 and the washer 44 may be formed by press forming from a metallic material such as an iron material, or a stainless steel strip. The insulating gaskets 42a, 42b, may be formed from synthetic resin that is thermoplastic and has electric insulating property, such as polypropylene, and polyphenylene sulfide. The electrode terminal 43 has a disk-shaped terminal part 43a and a columnar inserting part 43b that is provided protruding to one surface of the terminal part 43a. An opening to let the inserting part 43b of the electrode terminal 43 pass through is provided in the center of the sealing plate 41, the insulating gaskets 42a, 42b, and the washer 44. The inserting part 43b of the electrode terminal 43 is inserted through each opening of the insulating gasket 42a, the sealing plate 41, the insulating gasket 42b, and the washer 44, in this order, and the end part of the inserting part 43b is pressed and deformed in the axial direction and tightened, to complete the sealing member 40 as an integral component. The battery can 10 is sealed by welding a peripheral edge bent part 41b of the sealing plate 40 along an inner periphery of the battery can 10.

Figure 3A:
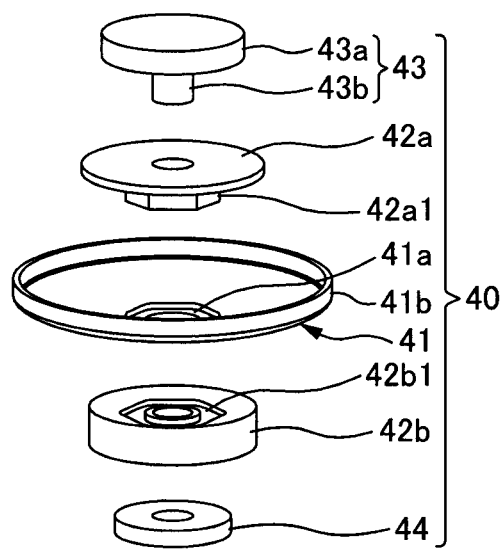
FIG. 3A is an exploded perspective view of the sealing member 40.
Figure 3B:
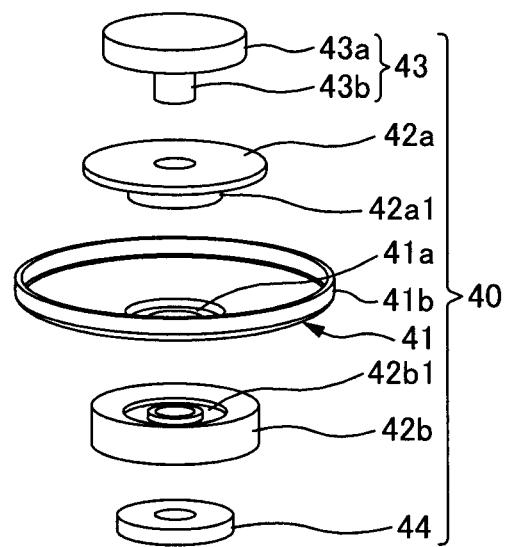
FIG. 3B is an exploded perspective view of the sealing member 40.

FIG. 3A and FIG. 3B show exploded perspective views of the sealing member 40. A protruding part 42a1 that protrudes downwards around the periphery of the opening is provided to a lower surface of the insulating gasket 42a arranged to an upper side of the sealing member 40 that seals the battery can 10. In the example in FIG. 3A, the plane shape of this protruding part 42a1 is hexagonal and in the example in FIG. 3B the plane shape of the protruding part 42a1 is circular. The plane shape of the protruding part 42a1 is not limited to the above, and an appropriate shape may be selected.

As shown in FIG. 3A and FIG. 3B, the lower surface of the insulating gasket 42a is received by the sealing plate 41. A recess part 41a, which corresponds to the shape and size of the protruding part 42a1 of the insulating gasket 42a, is provided in the periphery of the opening of the sealing plate 41. The shape and the size of the recess part 41a may be determined according to the properties of the material of the insulating gasket 42a, the shape of the protruding part 42a1, and the size of the protrusion. Specifically, the recess part 41a of the sealing plate 41 is formed by metal press work.

Further, as shown in FIG. 3A and FIG. 3B, the lower surface of the sealing plate 41 is received with the insulating gasket 42b. A recess part 42b1, which corresponds to the shape and the size of the recess part 41a of the sealing plate 41, is provided in the periphery of the opening of the insulating gasket 42b. The shape and the size of the recess part 42b1 may be determined according to the shape and the size of protrusion of the recess part 41a of the sealing plate 41. Specifically, the recess part 42b1 of the insulating gasket 42b is formed by resin molding.

Figure 4:
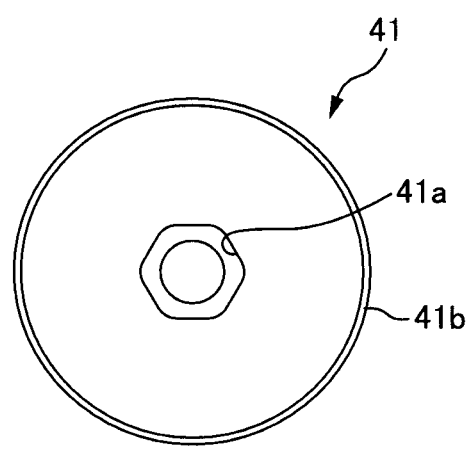
FIG. 4 is a plan view showing an example of the sealing member 40 of this embodiment.

FIG. 4 shows a plan view of the sealing plate 14 which corresponds to the structural example in FIG. 3A. In FIG. 4, a hexagonal recess part 41a is formed in the periphery of the opening of the sealing plate 41. On the other hand, in FIG. 5, although the basic structures are similar to those of the sealing member 40 of this embodiment shown in FIG. 2 to FIG. 4, there is shown a vertical section view of a sealing member 40 of a conventional example that is not provided with the protruding part 42a1 of the insulating gasket 42a, the recess part 41a of the corresponding sealing plate 41, and the recess part 42b1 of the insulating gasket 42b. With the sealing member 40 of the conventional example, the insulating gaskets 42a, 42b, that have been pressed with the terminal part 43a or pressed between the washer 44 and the sealing plate 41 tend to move outwards, as described above.

With the sealing member 40 of this embodiment, the insulating gasket 42a that has been compressed by tightening the inserting part 43b of the electrode terminal 43 is pressed to be in close contact with an inner wall of the recess part 41a of the sealing plate 41 and an outer surface of the inserting part 43b of the central electrode terminal 43, and the above has an effect of increasing the sealing performance of the battery can 10 with the sealing member 40. Further, by making the horizontal section shape of the protruding part 42a1 of the insulating gasket 42a, the corresponding recess part 41a of the sealing plate 41, and the recess part 42b1 of the insulating gasket 42b into a shape other than a circle, such as a polygon or an oval, then it becomes possible to increase the effect as a detent to prevent the sealing plate 41, and the insulating gaskets 42a, 42b, which have been tightened as the sealing member 40, from being inclined to rotate with respect to each other due to such as an impact that may be applied to the battery 1.

Figure 5:
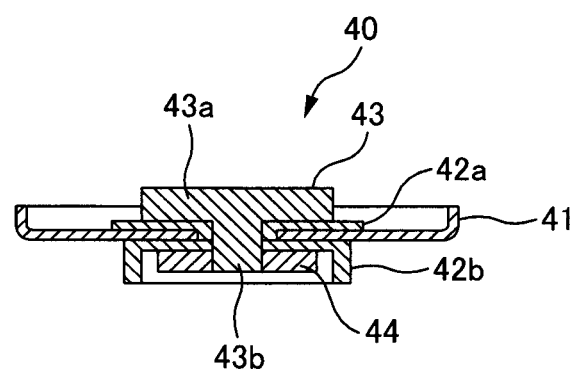
FIG. 5 is a vertical section view showing an example of a conventional sealing member 40.

In order to confirm the effect of this embodiment described above, the contact pressure between the protruding part 42a1 of the insulating gasket 42a of the sealing member 40 and the recess part 41a of the sealing plate 41 has been analyzed, and the above has been compared to the case of the sealing member 40 of the conventional example illustrated in FIG. 5. The comparison result is shown in Table 1.

TABLE 1

|  | Present Embodiment | Conventional product |
|---|---|---|
| Maximum value of contact pressure (MPa) | 570 | 520 |
| Contact pressure × distance (MPa · mm) | 115 | 105 |

As shown in Table 1, the maximum value of the contact pressure between the protruding part 42a1 of the insulating gasket 42a of the sealing member 40 and the recess part 41a of the sealing plate 41 has increased by approximately 10% in this embodiment than in the conventional example. Thus, the product between the contact pressure and the distance at which the contact pressure has been applied has also increased by approximately 10% in this embodiment than in the conventional example, and it is understood that sealability of the sealing member 40 has been improved.

As described in detail above, sealability of the tube-shaped battery including the sealing member 40 according to the embodiment of this invention has been further improved as compared to the conventional tube-shaped battery.

What is claimed is:

1. A sealing member of a tube-shaped battery to seal an opening of a battery can, the sealing member being used to configure a tube-shaped battery provided with the bottomed tube-shaped battery can and a power generating element that has been arranged inside the battery can, the sealing member comprising:
    an electrode terminal that is to be electrically connected to a power generating element;
    a tabular sealing plate having a flat shape that comes in close contact with an inner peripheral surface of an opening of a battery can; and
    an insulating gasket that comes in close contact with the sealing plate and the electrode terminal in order to electrically insulate between the sealing plate and the electrode terminal,
    wherein a side of the insulating gasket adjacent to the sealing plate is provided with a protruding part having a predetermined horizontal section shape around an opening of the insulating gasket,
    a side of the sealing plate adjacent to the insulating gasket is provided with a recess part that has been formed in a shape corresponding to the protruding part around an opening of the sealing plate, and
    an inserting part that is a columnar member extending from the electrode terminal is inserted into the sealing plate and the insulating gasket and at least the sealing plate and the insulating gasket are pressed to each other, and the protruding part of the insulating gasket is held in a compressed state in the recess part of the sealing plate and the protruding part is pressed to an inner surface of the recess part and to an outer peripheral surface of the electrode terminal.

2. The sealing member of a tube-shaped battery according to claim 1, wherein
    the insulating gasket includes a first member having the protruding part and a second member arranged in an opposite side to the first member so that the sealing plate is disposed between the first member and the second member, and a side of the second member adjacent to the sealing plate is provided with a recess part that corresponds to a projecting part appearing as a back side of the recess part of the sealing plate.

3. A tube-shaped battery comprising:
    a bottomed tube-shaped battery can;
    a power generating element that has been arranged inside the battery can; and
    a sealing member to seal an opening of the battery can, the sealing member including an electrode terminal that is to be electrically connected to the power generating element,
    wherein the sealing member includes
    a tabular sealing plate having a flat shape that comes in close contact with an inner peripheral surface of the opening of the battery can, and
    an insulating gasket that comes in close contact with the sealing plate and the electrode terminal in order to electrically insulate between the sealing plate and the electrode terminal,
    a side of the insulating gasket adjacent to the sealing plate is provided with a protruding part having a predetermined horizontal section shape around an opening of the insulating gasket,
    a side of the sealing plate adjacent to the insulating gasket is provided with a recess part formed in a shape corresponding to the protruding part around an opening of the sealing plate,
    an inserting part that is a columnar member extending from the electrode terminal is inserted into the sealing plate and the insulating gasket and at least the sealing plate and the insulating gasket are pressed to each other, and the protruding part of the insulating gasket is held in a compressed state in the recess part of the sealing plate and the protruding part is pressed to an inner surface of the recess part and to an outer peripheral surface of the electrode terminal.

* * * * *